United States Patent
Goto et al.

(10) Patent No.: US 10,853,287 B2
(45) Date of Patent: Dec. 1, 2020

(54) INFORMATION PROCESSING SYSTEM, SEMICONDUCTOR INTEGRATED CIRCUIT, AND INFORMATION PROCESSING METHOD

(71) Applicant: SOCIONEXT INC., Yokohama (JP)

(72) Inventors: Seiji Goto, Yokohama (JP); Eiichi Nimoda, Yokohama (JP); Satoru Okamoto, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 16/392,240

(22) Filed: Apr. 23, 2019

(65) Prior Publication Data
US 2019/0251049 A1   Aug. 15, 2019

Related U.S. Application Data
(63) Continuation of application No. PCT/JP2017/041935, filed on Nov. 22, 2017.

(30) Foreign Application Priority Data
Nov. 30, 2016  (JP) .................. 2016-232340

(51) Int. Cl.
G06F 13/36   (2006.01)
G06F 13/42   (2006.01)
G06F 13/38   (2006.01)

(52) U.S. Cl.
CPC .............. G06F 13/36 (2013.01); G06F 13/38 (2013.01); G06F 13/42 (2013.01)

(58) Field of Classification Search
CPC ................................. G06F 13/36; G06F 13/42
See application file for complete search history.

(56) References Cited

U.S. PATENT DOCUMENTS 7,480,303 B1   1/2009  Ngai
8,180,996 B2 *  5/2012  Fullerton ............ G06F 12/1081
                                                   711/103
(Continued)

FOREIGN PATENT DOCUMENTS

EP   2365445 A1   9/2011
EP   2515241 A2   10/2012
(Continued)

OTHER PUBLICATIONS

Extended European Search Report issued by the European Patent Office in corresponding European Application No. 17877100.2, dated Nov. 12, 2019.
(Continued)

*Primary Examiner* — Henry Tsai
*Assistant Examiner* — Christopher A Daley
(74) *Attorney, Agent, or Firm* — Arent Fox LLP

(57) ABSTRACT

Processing by an information processing system is speeded up. A first semiconductor integrated circuit designates a first address of a memory connected to a second semiconductor integrated circuit that is a data transmission destination, based on first memory map information in which addresses of memories respectively used by the semiconductor integrated circuits are defined, converts the first address to a second address of the memory defined in second memory map information referred to by the data transmission destination, and outputs the second address and transmission data by using a PCIe interface. A switch transfers the second address and the transmission data to the data transmission destination by using PCIe interfaces. The data transmission destination receives the second address and the transmission data by using a PCIe interface and writes the transmission data into the reception buffer region of the memory corresponding to the second address.

20 Claims, 9 Drawing Sheets

(56) References Cited

U.S. PATENT DOCUMENTS

| | | | |
|---|---|---|---|
| 8,214,604 B2* | 7/2012 | Armilli | G06F 12/0284 |
| | | | 711/147 |
| 8,484,307 B2* | 7/2013 | Arimilli | G06F 12/109 |
| | | | 709/213 |
| 2010/0070675 A1* | 3/2010 | Yamazaki | G06F 13/4027 |
| | | | 710/316 |
| 2011/0225341 A1* | 9/2011 | Satoh | G06F 13/405 |
| | | | 710/314 |
| 2011/0289263 A1* | 11/2011 | McWilliams | G06F 12/0284 |
| | | | 711/103 |
| 2014/0269754 A1 | 9/2014 | Eguchi et al. | |
| 2015/0067229 A1 | 3/2015 | Connor et al. | |
| 2015/0220405 A1* | 8/2015 | Neef | G06F 11/1438 |
| | | | 714/15 |

FOREIGN PATENT DOCUMENTS

| | | |
|---|---|---|
| JP | 2012-128717 A | 7/2012 |
| WO | WO 2007/105373 A1 | 9/2007 |
| WO | WO 2013/136522 A1 | 9/2013 |

OTHER PUBLICATIONS

International Search Report of related International Patent Application No. PCT/JP2017/041935 dated Feb. 6, 2018.
Written Opinion of the International Searching Authority of related International Patent Application No. PCT/JP2017/041935, with partial translation, dated Feb. 6, 2018.

* cited by examiner

INFORMATION PROCESSING SYSTEM, SEMICONDUCTOR INTEGRATED CIRCUIT, AND INFORMATION PROCESSING METHOD

CROSS-REFERENCE TO RELATED APPLICATION

This application is a continuation application of International Application PCT/JP2017/041935 filed on Nov. 22, 2017 and designated the U.S., which is based upon and claims the benefit of priority of the prior Japanese Patent Application No. 2016-232340, filed on Nov. 30, 2016, the entire contents of which are incorporated herein by reference.

FIELD

The embodiments discussed herein are related to an information processing system, a semiconductor integrated circuit, and an information processing method.

BACKGROUND

The increasing scale and complexity of information processing systems has led to the development of information processing systems equipped with a plurality of SoCs (Systems on Chip). One example of an information processing system equipped with a plurality of SoCs is a CPU (Central Processing Unit) cluster in which a plurality of CPUs are connected by a network to enable parallel processing by the CPUs.

One conventional technology used when connecting a plurality of servers using Ethernet (registered trademark) switches uses PCIe (Peripheral Component Interconnect express) to reduce the hardware of the Ethernet switches. There is also a technology that uses a PCIe switch to connect a plurality of processors and enable a given processor to access a memory connected to another processor. Using PCIe instead of Ethernet for communication between servers at a data center has also been proposed.

See, for example, U.S. Pat. No. 7,480,303, U.S. Patent Application Publication No. 2015/0067229, and International Publication Pamphlet No. WO2013136522.

To realize a CPU cluster capable of high-speed processing, it would be conceivably possible to configure the cluster as a tightly-coupled cluster. In a tightly-coupled cluster, the individual CPUs perform cooperative processing using a shared memory and/or intra-process communication. As the network that connects the plurality of CPUs, it would be conceivable to use an Ethernet that is capable of high-speed communication at a comparatively low cost. However, when an Ethernet is used, there are protocol overheads, such as a transmitter having to wait for reception of a response signal from the destination before performing the next transmission, which limits how fast a tightly-coupled cluster can operate.

SUMMARY

According to one aspect, there is provided an information processing system including: a first semiconductor integrated circuit configured to designate, based on first memory map information in which addresses of memories used respectively by a plurality of semiconductor integrated circuits are defined, a first address of a first memory connected to a data transmission destination that is one out of the plurality of semiconductor integrated circuits, to convert the first address to a second address of the first memory, the second address being defined in second memory map information referred to by the data transmission destination, and to output the second address and transmission data by using a bus interface that is capable of continuously transmitting without waiting for a response from the data transmission destination; a switch configured to transfer the second address and the transmission data to the data transmission destination by using the bus interface; and a second semiconductor integrated circuit that is the data transmission destination and is configured to receive the second address and the transmission data by using the bus interface and to write the transmission data into a reception buffer region of the first memory, the reception buffer region being corresponding to the second address.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Several embodiments will be described below with reference to the accompanying drawings.

First Embodiment

Figure 1:
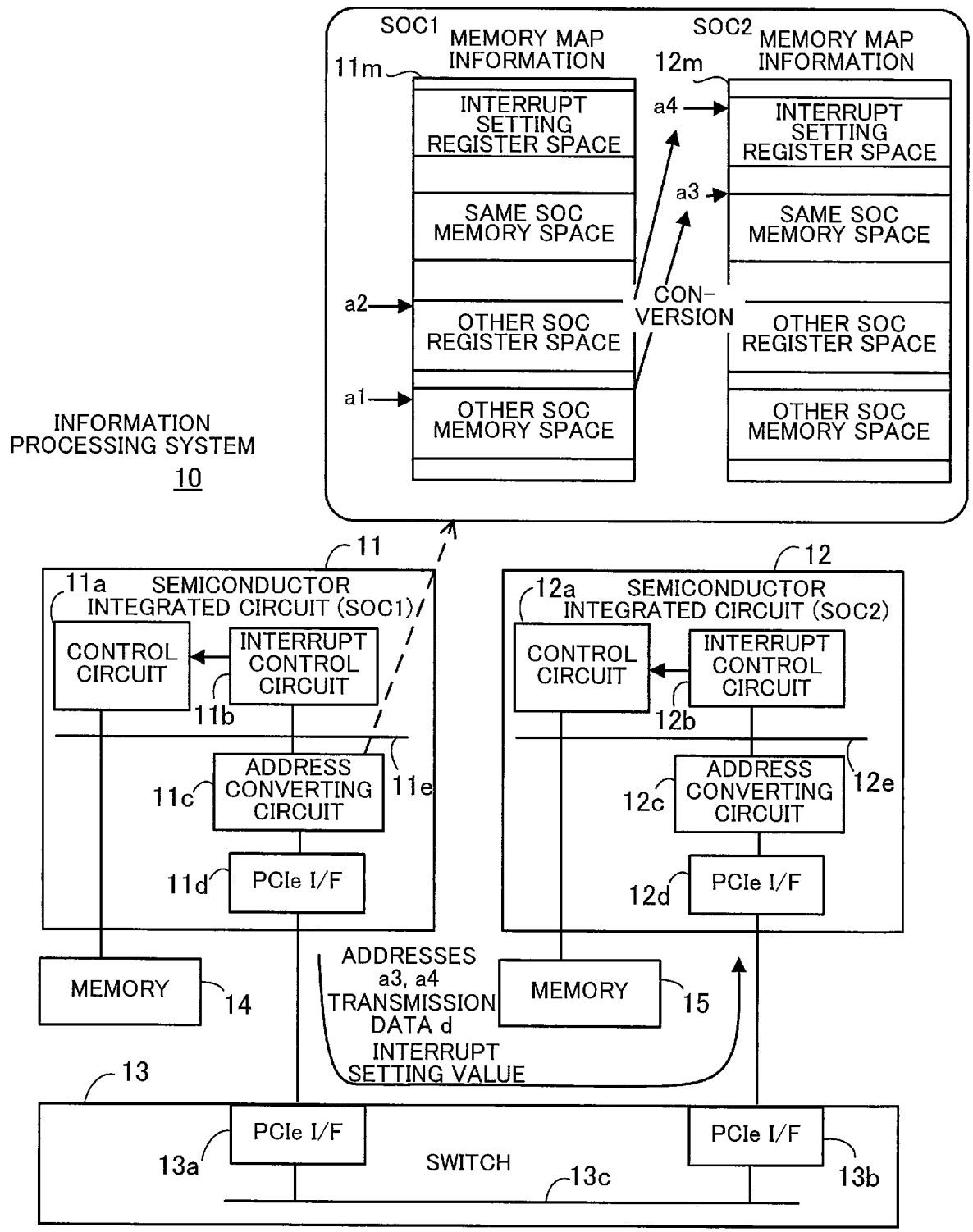
FIG. 1 depicts one example of an information processing system according to a first embodiment.

FIG. 1 depicts one example of an information processing system according to a first embodiment.

An information processing system 10 includes semiconductor integrated circuits 11 and 12, a switch 13, and memories 14 and 15.

As one example, the semiconductor integrated circuits 11 and 12 and the switch 13 are all single-chip SoCs. Although two semiconductor integrated circuits 11 and 12 and one switch 13 are illustrated in FIG. 1 to simplify the description, the information processing system 10 is not limited to these numbers. An example of an information processing system including three or more semiconductor integrated circuits and two or more switches will be described later.

The semiconductor integrated circuit 11 includes a control circuit 11a, an interrupt control circuit 11b, an address converting circuit 11c, a PCIe interface 11d, and a system bus 11e. The memory 14 is connected to the semiconductor integrated circuit 11.

The control circuit 11a controls the various components of the semiconductor integrated circuit 11 via the system bus 11e to execute a variety of application processing. As examples, the control circuit 11a is a microcontroller, a CPU, or a CPU including a plurality of CPU cores.

The interrupt control circuit 11b notifies the control circuit 11a of the occurrence of an interrupt based on an interrupt setting value set in a storage circuit (referred to hereinafter as an "interrupt setting register"), not illustrated.

The address converting circuit 11c converts addresses based on memory map information 11m and 12m, in which addresses in the memories 14 and 15 that are used by the plurality of semiconductor integrated circuits 11 and 12 and the like are defined.

The PCIe interface 11d is one example of a bus interface capable of transmitting continuously without waiting for a response from the transmission destination, and transmits and receives information to and from the switch 13 via a PCIe bus.

In the same way as the semiconductor integrated circuit 11, the semiconductor integrated circuit 12 includes a control circuit 12a, an interrupt control circuit 12b, an address converting circuit 12c, a PCIe interface 12d, and a system bus 12e.

The switch 13 includes PCIe interfaces 13a and 13b, and a system bus 13c that connects the PCIe interfaces 13a and 13b.

The PCIe interface 13a transmits and receives information to and from the PCIe interface 11d of the semiconductor integrated circuit 11.

The PCIe interface 13b transmits and receives information to and from the PCIe interface 12d of the semiconductor integrated circuit 12.

When the PCIe interfaces 11d, 12d, 13a, and 13b are used in the information processing system 10 like that depicted in FIG. 1, the PCIe interfaces 11d and 12d are set so that the semiconductor integrated circuits 11 and 12 are end points. The PCIe interfaces 13a and 13b are set so that the switch 13 is a root complex.

Note that in place of the PCIe interfaces 11d, 12d, 13a, and 13b, it is also possible to use USB (Universal Serial Bus) interfaces or the like, which are another example of a bus interface capable of transmitting continuously without waiting for a response from a transmission destination.

The memories 14 and 15 are memories that are connected to the semiconductor integrated circuits 11 and 12, respectively, and store programs to be executed by the control circuits 11a and 12a and various data (which includes reception data and the like). As examples, the memories 14 and 15 may be volatile semiconductor memories, such as DRAM (Dynamic Random Access Memory) or may be volatile storage, such as flash memory. Note that the memories 14 and 15 may be included in the semiconductor integrated circuits 11 and 12. The memories 14 and 15 may each be composed of a plurality of memories.

An example operation of the information processing system 10 where the semiconductor integrated circuit 11 is the transmitter of data and the semiconductor integrated circuit 12 is the transmission destination of the data will now be described. The same processing is performed when the semiconductor integrated circuit 11 is the transmission destination and the semiconductor integrated circuit 12 is the transmitter.

Note that in the following description, the semiconductor integrated circuit 11 may be referred to as "SOC1" and the semiconductor integrated circuit 12 as "SOC2".

When transmitting data to the semiconductor integrated circuit 12, the control circuit 11a designates an address based on the memory map information 11m of SOC1 like that depicted in FIG. 1.

An address of a memory space of the memory 14 of the same SOC (that is, SOC1) and an address of a memory space of the memory 15 of the other SOC (that is, SOC2) are defined in the memory map information 11m. An address of an interrupt setting register space of the same SOC and an address of an interrupt setting register space of the other SOC are also defined in the memory map information 11m. As one example, interrupt setting registers (not illustrated) are provided inside the interrupt control circuits 11b and 12b.

Note that in the memory map information 12m referred to by the semiconductor integrated circuit 12 also, the address of the memory space of the memory 15 of the same SOC (that is, SOC2) and the address of the memory space of the memory 14 of the other SOC (that is, SOC1) are defined in the same way as in the memory map information 11m. In addition, the address of the interrupt setting register space of the same SOC and the address of the interrupt setting register space of the other SOC are also defined in the memory map information 12m.

When transmitting data to the semiconductor integrated circuit 12, the control circuit 11a designates an address defined in the memory map information 11m of the memory 15 into which the data (transmission data) is to be written. FIG. 1 depicts an example where the control circuit 11a has designated an address a1 of the other SOC memory space defined in the memory map information 11m.

When the control circuit 11a has designated the address a1, as one example the address converting circuit 11c uses a conversion table or the like, not depicted, to convert the address a1 to an address a3 of a memory space of SOC2 that is defined in the memory map information 12m of SOC2. The PCIe interface 11d outputs (that is, transmits) the converted address a3 and the transmission data. The address a3 and the transmission data are transferred to the semiconductor integrated circuit 12 by the switch 13.

The semiconductor integrated circuit 12 uses the PCIe interface 12d to receive the address a3 and the transmission data, and writes the transmission data into a reception buffer region of the memory 15 that corresponds to the address. As one example, the address converting circuit 12c uses a conversion table or the like, not depicted, to convert the address a3 to an actual address in the memory 15. In this way, the transmission data is written in a reception buffer region of the memory 15 that starts at the converted address.

After this, the control circuit 11a of the semiconductor integrated circuit 11 designates an address, which is defined by the memory map information 11m, of an interrupt setting register of the semiconductor integrated circuit 12. FIG. 1 depicts an example where the control circuit 11a has designated an address a2 of the other SOC register space defined in the memory map information 11m.

When the control circuit 11a has designated the address a2, as one example the address converting circuit 11c uses a conversion table or the like, not depicted, to convert the address a2 to an address a4 of the interrupt setting register space of SOC2 that is defined in the memory map information 12m of SOC2. The PCIe interface 11d outputs (transmits) the converted address a4 and an interrupt setting value (for example, "1") indicating the occurrence of an interrupt.

The address a4 and the interrupt setting value are transferred to the semiconductor integrated circuit 12 by the switch 13.

The semiconductor integrated circuit 12 uses the PCIe interface 12d to receive the address a4 and the interrupt setting value and writes the interrupt setting value into the interrupt setting register corresponding to the address. As one example, the address converting circuit 12c uses a conversion table or the like, not depicted, to convert the address a4 to an actual address of an interrupt setting register. The interrupt setting value is written into the interrupt setting register designated by this address.

When the interrupt setting value indicating the occurrence of an interrupt has been written into the interrupt setting register, the interrupt control circuit 12b notifies the control circuit 12a that an interrupt has occurred. From this, the control circuit 12a determines that the reception (write) of transmission data has ended and reads out the transmission data that was written into the reception buffer region of the memory 15. The control circuit 12a may then execute a variety of application processing using the read transmission data, for example.

As described above, with the information processing system 10 according to the first embodiment, the semiconductor integrated circuit 11 designates, based on the memory map information 11m, the address a1 of the memory 15 to be used by the data transmission destination (that is, the semiconductor integrated circuit 12), which is one out of the plurality of semiconductor integrated circuits 11 and 12. The semiconductor integrated circuit then converts the address to the address a3 of the memory 15 defined in the memory map information 12m referred to by the data transmission destination. The semiconductor integrated circuit 11 then outputs the address a3 and the transmission data using the PCIe interface 11d. The switch 13 transfers the address a3 and the transmission data to the data transmission destination using the PCIe interfaces 13a and 13b. The semiconductor integrated circuit 12 that is the data transfer destination uses a PCIe interface to receive the address a3 and the transmission data, and performs a write of the transmission data into a reception buffer region of the memory 15 corresponding to the address a3.

By doing so, the semiconductor integrated circuit 11 becomes capable of transmission (that is, write) processing that directly designates an address based on the memory map information 11m in which addresses in the memory 15 used by the semiconductor integrated circuit 12 are defined. Since the PCIe interfaces 11d, 12d, 13a, and 13b are used in the information processing system 10, the semiconductor integrated circuit 11 is capable of continuously performing data transmissions without waiting for responses from the data transmission destinations. By doing so, it is possible to increase the processing speed of the information processing system 10.

It is possible, without using an expensive high-speed network like that used in a supercomputer, to realize a relatively inexpensive tightly-coupled CPU cluster that has high parallelism and high performance. In addition, by avoiding the use of a high performance CPU that has high power consumption, it is possible to lower the power consumption of the information processing system 10.

The semiconductor integrated circuit 11 directly designates, based on the memory map information 11m in which the address of the interrupt setting register of the semiconductor integrated circuit 12 is defined, the address of the interrupt setting register and sets the interrupt setting value. When an interrupt setting value indicating the occurrence of an interrupt has been set, the semiconductor integrated circuit 12 determines that the reception (write) has ended, and reads out the transmission data. By doing so, it is possible to virtually recreate an Ethernet protocol where data read processing is triggered by packet reception.

Second Embodiment

Figure 2:
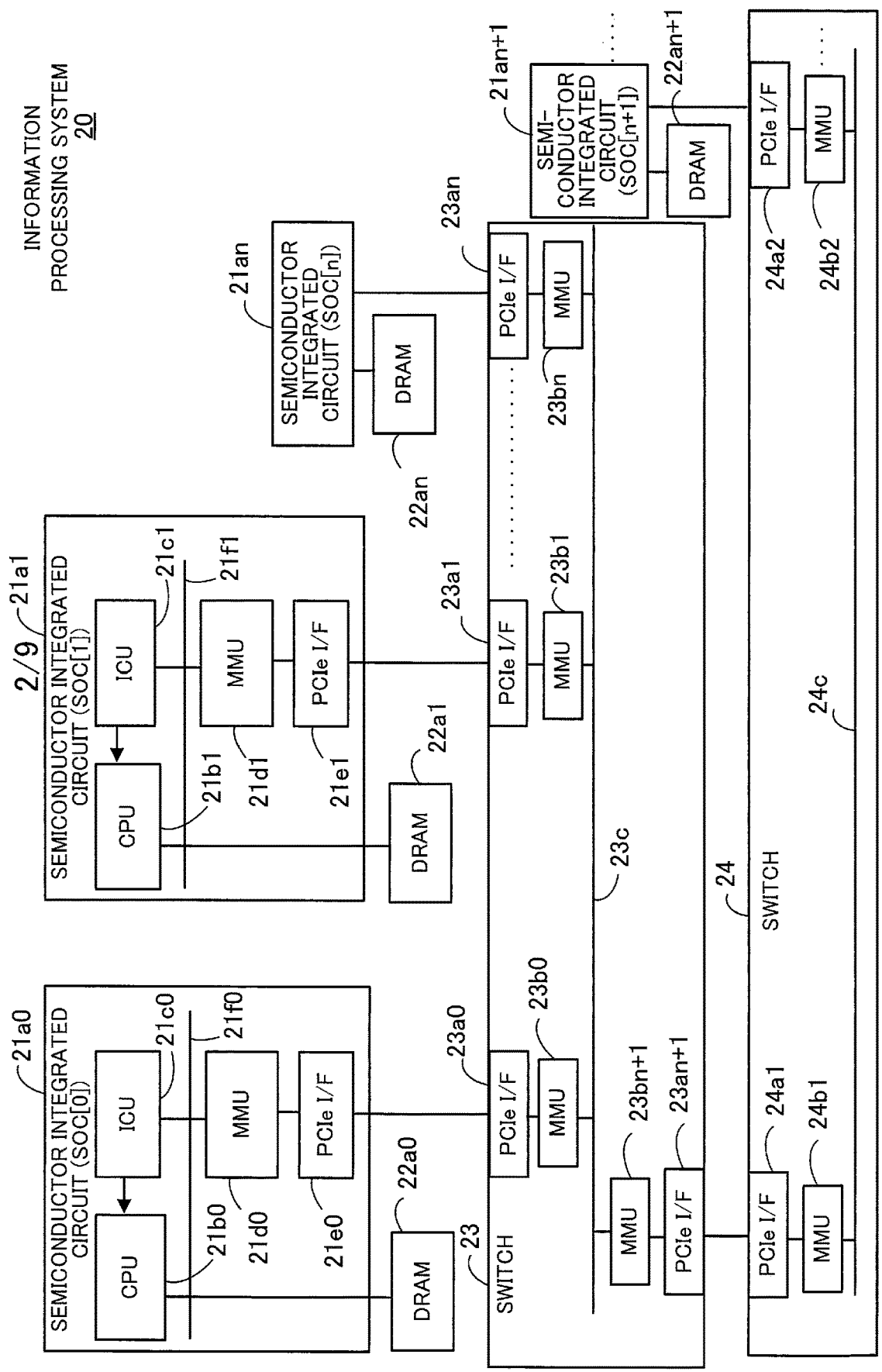
FIG. 2 depicts one example of an information processing system according to a second embodiment.

FIG. 2 depicts one example of an information processing system according to a second embodiment.

The information processing system 20 includes a plurality of semiconductor integrated circuits 21a0, 21a1, 21an, and 21an+1 and a plurality of DRAM including DRAM 22a0, 22a1, 22an, and 22an+1. The information processing system 20 additionally includes switches 23 and 24 in a two-stage configuration.

The semiconductor integrated circuit 21a0 includes a CPU 21b0, an ICU (Interrupt Controller Unit) 21c0, an MMU (Memory Management Unit) 21d0, a PCIe interface 21e0, and a system bus 21f0. The DRAM 22a0 is connected to the semiconductor integrated circuit 21a0.

The CPU 21b0 is one example of the control circuit 11a depicted in FIG. 1 and controls the various components of the semiconductor integrated circuit 21a0 via the system bus 21f0.

The ICU 21c0 is one example of the interrupt control circuit 11b depicted in FIG. 1, and notifies the CPU 21b0 of the occurrence of an interrupt.

The MMU 21d0 has the functions of the address converting circuit 11c depicted in FIG. 1 and converts addresses based on memory map information in which the addresses of the plurality of DRAMs and the like are defined.

The PCIe interface 21e0 is one example of a bus interface capable of continuously transmitting without waiting for a response from the transmission destination, and transmits and receives information to and from the switch 23.

In the same way as the semiconductor integrated circuit 21a0, the semiconductor integrated circuit 21a1 includes a CPU 21b1, an ICU 21c1, an MMU 21d1, a PCIe interface 21e1, and a system bus 21f1. Although not illustrated, the other semiconductor integrated circuits are configured with the same elements.

The switch 23 includes PCIe interfaces 23a0, 23a1, ..., 23an, 23an+1, MMU 23b0, 23b1, ..., 23bn, 23bn+1, and a system bus 23c. The switch 24 includes a plurality of PCIe interfaces including PCIe interfaces 24a1 and 24a2, a plurality of MMU including MMU 24b1 and 24b2, and a system bus 24c.

In the switch 23, the PCIe interfaces 23a0 to 23an+1 are connected to the system bus 23c via the MMU 23b0 to 23bn+1, respectively. In the switch 24, the PCIe interfaces 24a1 and 24a2 are connected to the system bus 24c via the MMU 24b1 and 24b2, respectively.

The PCIe interface 23a0 performs transmission and reception of information to and from the PCIe interface 21e0 of the semiconductor integrated circuit 21a0. The PCIe interface 23a1 performs transmission and reception of information to and from the PCIe interface 21e1 of the semiconductor integrated circuit 21a1. The PCIe interface 23an performs transmission and reception of information to and from the PCIe interface (not illustrated) of the semiconductor integrated circuit 21an. The PCIe interface 23an+1 performs transmission and reception of information to and from the PCIe interface 24a1 of the switch 24. The PCIe interface 24a2 performs transmission and reception of information to and from the PCIe interface (not illustrated) of the semiconductor integrated circuit 21an+1.

In the information processing system 20 depicted in FIG. 2, the PCIe interfaces 21e0 and 21e1 are set so that the semiconductor integrated circuits 21a0 and 21a1 are end points. The PCIe interfaces 23a0 to 23an, 24a1, and 24a2 are set so that the switches 23 and 24 are a root complex. The PCIe interface 23an+1 is set so that the switch 23 is an end point.

The MMU 23b0 has a function for using a conversion table or the like, not illustrated, to convert an address received by the PCIe interface 23a0 to another address. The MMU 23b1 has a function for using a conversion table or the like, not illustrated, to convert an address received by the PCIe interface 23a1 to another address. The MMU 23bn has a function for using a conversion table or the like, not illustrated, to convert an address received by the PCIe interface 23an to another address. The MMU 23bn+1 has a function for using a conversion table or the like, not illustrated, to convert an address received by the PCIe interface 23an+1 or an address transmitted by the PCIe interface 23an+1 to another address. The MMU 24b1 has a function for using a conversion table or the like, not illustrated, to convert an address received by the PCIe interface 23an to another address. The MMU 24b2 has a function for using a conversion table or the like, not illustrated, to convert an address received by the PCIe interface 24a2 to another address.

In the information processing system 20 described above, n+1 semiconductor integrated circuits 21a0 to 21an are connected to the switch 23. In the same way, a plurality of semiconductor integrated circuits including the semiconductor integrated circuit 21an+1 are connected to the switch 24.

This means that when the semiconductor integrated circuit 21a0 performs a data write into the DRAM 22an+1, two types of address outputted by the semiconductor integrated circuit 21a0, the transmission data, and an interrupt setting value are transferred via the switches 23 and 24 to the semiconductor integrated circuit 21an+1.

As one example, even when there is a maximum number of semiconductor integrated circuits that can be connected to one switch due to physical limitations or the like, by adding the switch 24 as depicted in FIG. 2, it is possible to realize an information processing system 20 that includes a large number of semiconductor integrated circuits. Note that although an example that includes the two switches 23 and 24 is depicted in FIG. 1, it is also possible to include three or more switches.

In addition, in the information processing system 20 described above, the switches 23 and 24 are equipped with MMUs 23b0 to 23bn+1, 24b1, and 24b2.

By providing the MMU 23b0 to 23bn+1, 24b1, and 24b2, it is possible to change the connection state used in communication.

As one example, consider a case where the semiconductor integrated circuit 21a0 outputs an address in the DRAM 22a1 that is defined by the memory map information referred to by the semiconductor integrated circuits 21a1 as the address of the data transmission destination (or "write destination"). Here, once the MMU 23b0 of the switch 23 has converted this address to the address of the DRAM 22an defined by the memory map information referred to by the semiconductor integrated circuit 21an for example, it is possible to write the transmission data into the DRAM 22an. The MMU 23b0 is also capable of performing the same conversion for the address of the interrupt setting register.

By doing so, it is possible, when for example the connection between the semiconductor integrated circuit 21a1 and the switch 23 has been lost, to switch to a different data transmission destination without changing the other semiconductor integrated circuits. That is, it is possible to change the connection state used in communication.

In the information processing system 20 described above, the N semiconductor integrated circuits that include the semiconductor integrated circuits 21a0 to 21an+1 designate the address of the write destination based on memory map information like that described below. This memory map information may be stored in a memory (the DRAM 22a0) used by N semiconductor integrated circuits including the semiconductor integrated circuits 21a0 to 21an+1, in a ROM (Read Only Memory) provided in each of the N semiconductor integrated circuits, or the like.

Note that the N semiconductor integrated circuits including the semiconductor integrated circuits 21a0 to 21an+1 are indicated as SOC[0] to SOC[N]. As examples, the semiconductor integrated circuit 21a0 is indicated as SOC[0] and the semiconductor integrated circuit 21a1 is indicated as SOC[1].

Figure 3:
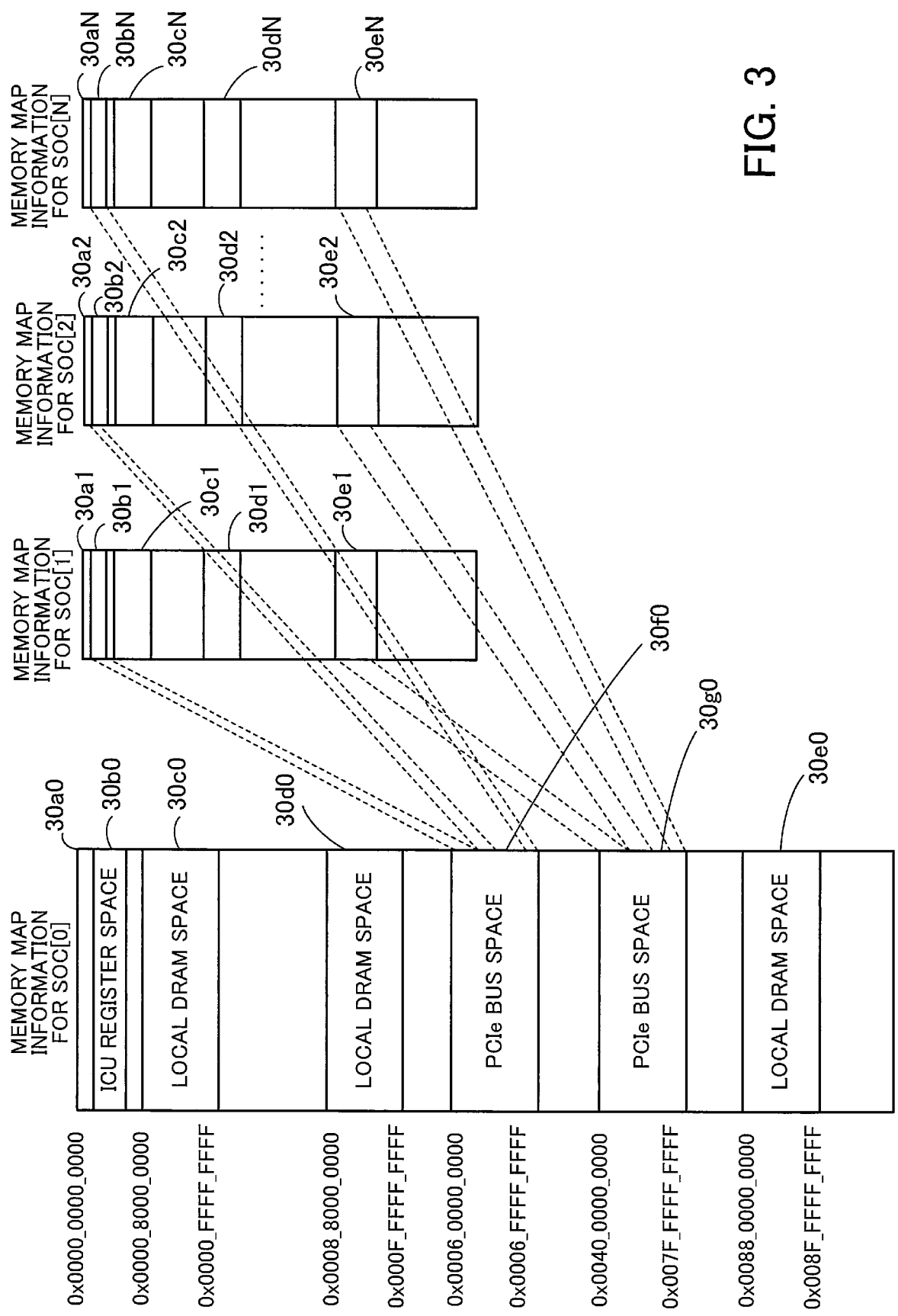
FIG. 3 depicts one example of memory map information.

FIG. 3 depicts one example of memory map information.

Addresses of an ICU register space 30b0, local DRAM spaces 30c0, 30d0, and 30e0, and PCIe bus spaces 30f0 and 30g0 are defined in the memory map information 30a0 for SOC[0].

The address of the ICU register space 30b0 corresponds to the address of the interrupt setting register that stores the interrupt setting value used by the ICU 21c0 of SOC[0] to decide whether to notify the CPU 21b0 of the occurrence of an interrupt. The interrupt setting register is provided in the ICU 21c0, for example.

The addresses of the local DRAM spaces 30c0 to 30e0 correspond to addresses in the DRAM 22a0. In the example in FIG. 3, there are three local DRAM spaces 30c0 to 30e0. The local DRAM space 30c0 is defined by addresses 0x0000_8000_0000 to 0x0000_FFFF_FFFF. The local DRAM space 30c0 is defined by addresses 0x0008_8000_0000 to 0x000F_FFFF_FFFF. The local DRAM space 30e0 is defined by addresses 0x0088_0000_0000 to 0x008F_FFFF_FFFF. The number of local DRAM spaces is not limited to three.

The addresses in the PCIe bus space 30f0 correspond to the addresses of the interrupt setting registers of the other SOC[1], SOC[2], . . . , SOC[N] that are connected by a PCIe bus. In the example in FIG. 3, the PCIe bus space 30f0 is defined by addresses 0x0006_0000_0000 to 0x0006_FFFF_FFFF. The addresses in the PCIe bus space 30f0 correspond to the addresses of the ICU register spaces 30b1, 30b2, . . . , 30bN defined by the memory map information 30a1, 30a2, . . . , 30aN for SOC[1] to SOC[N].

The addresses in the PCIe bus space 30g0 correspond to addresses of memories (such as the DRAM 22a1) used by the other SOC[1], SOC[2], . . . , SOC[N] that are connected by a PCIe bus. In the example in FIG. 3, the PCIe bus space 30g0 is defined by addresses 0x0040_0000_0000 to 0x007F_FFFF_FFFF. The addresses of the memories used by SOC[1] to SOC[N] are defined as addresses of local DRAM spaces 30c1, 30d1, 30e1, 30c2, 30d2, 30e2, . . . , 30cN, 30dN, and 30eN in the memory map information 30a1 to 30aN. The addresses in the PCIe bus space 30g0 are associated with addresses of the local DRAM spaces 30e1 to 30eN in the memory map information 30a1 to 30aN.

In the example in FIG. 3, the local DRAM spaces 30e0 to 30eN defined in the respective memory map information 30a0 to 30aN function as reception buffer regions into which write data transmitted from another SOC is written. That is, the local DRAM spaces 30e0 to 30eN are shared regions that are accessible from other SOCs.

Note that although not illustrated, PCIe bus spaces are also defined in the memory map information $30a1$ to $30aN$ for SOC[1] to SOC[N]. Addresses of memory spaces of other peripherals may also be defined in the memory map information $30a0$ to $30aN$.

Figure 4:
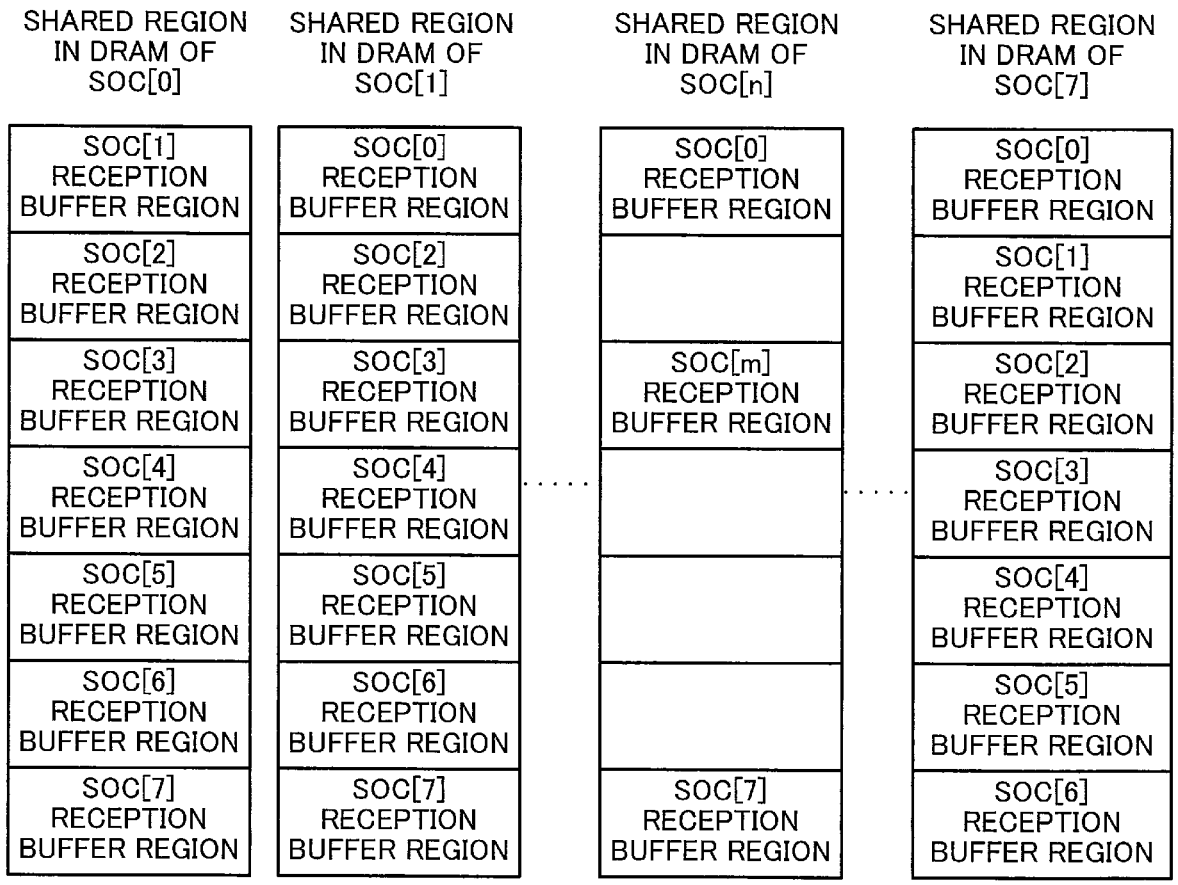
FIG. 4 depicts one example of a shared region in the DRAM of an SOC.

FIG. 4 depicts one example of a shared region in the DRAM of an SOC. In FIG. 4, one example of a shared region in a DRAM (such as DRAM $22a0$ to $22an+1$) used by eight SOC[0] to SOC[7] is depicted.

Reception buffer regions for SOC[1] to SOC[7] are set in order in a shared region in the DRAM $22a0$ used by SOC[0]. Reception buffer regions for SOC[0] and SOC[2] to SOC[7] are set in order in a shared region in DRAM $22a1$ of SOC[1]. Reception buffer regions for SOC[0] to SOC[6] are set in order in a shared region in the DRAM of SOC[7].

Transmission data transmitted by SOC[m] is written into the reception buffer region for SOC[m] in the shared region in the DRAM $22an$ of SOC[n]. The reception buffer regions in the respective shared regions are set so that the respective reception buffers for SOC[0] to SOC[7] are designated by different addresses. That is, the assignment of reception buffers in each shared region is fixed so that a plurality of SOC do not write into the same buffer. This means that it is possible to prevent overwriting with transmission data from another SOC.

Note that although each shared region is divided into seven in the example in FIG. 4, when N=63, each shared region may be divided into 63 parts. However, it is also possible to divide into 8 or 64, which is easy to handle from the viewpoint of software implementation, and when there is ample DRAM capacity, the remaining region may be left in an unusable state.

Figure 5:
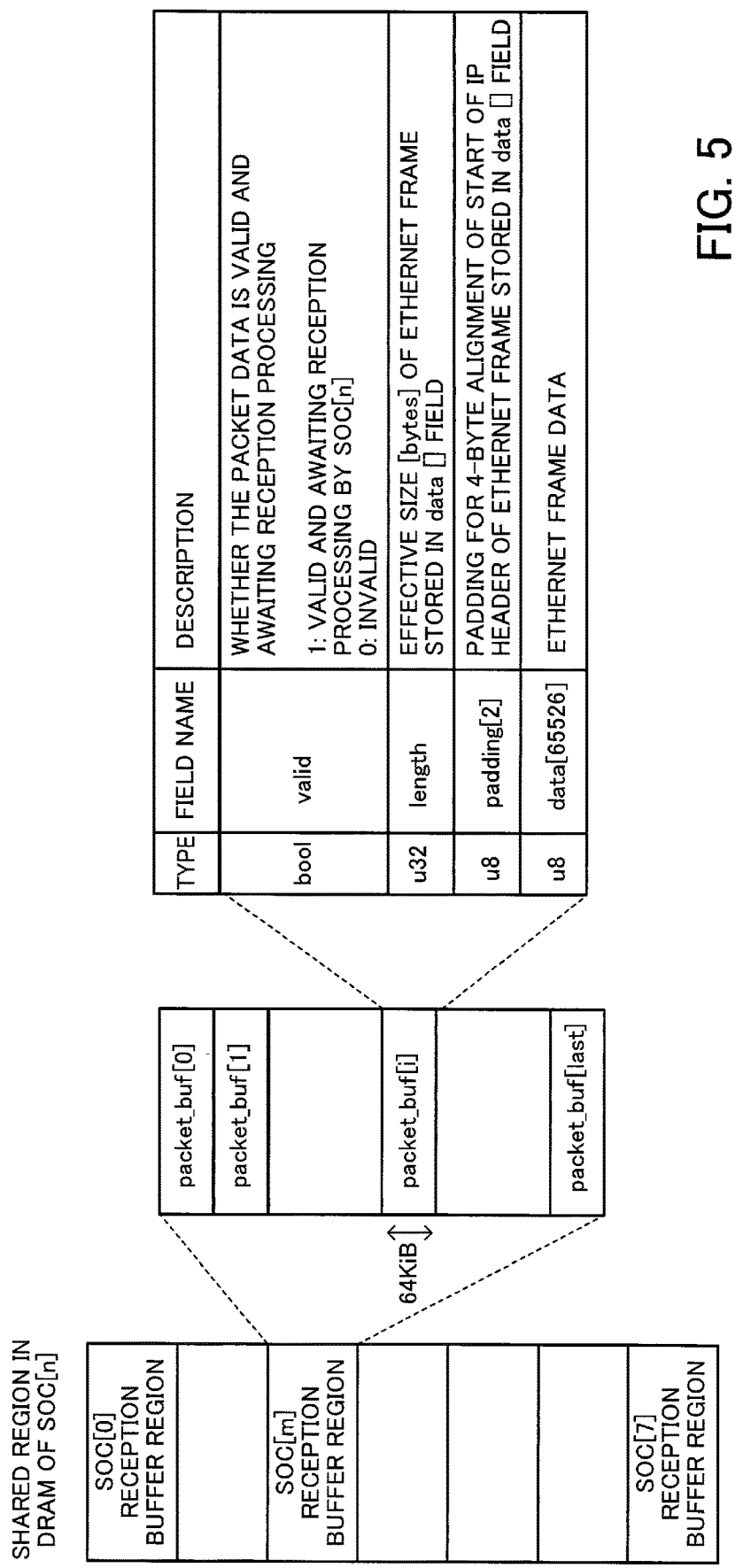
FIG. 5 depicts one example of packet data stored in a reception buffer region.

FIG. 5 depicts one example of packet data stored in a reception buffer region. FIG. 5 depicts one example of packet data stored in the reception buffer region for SOC[m] in a shared region in the DRAM for SOC[n] depicted in FIG. 4.

As one example, the reception buffer region is divided into packet_buf[0], packet_buf[1], . . . , packet_buf[i], . . . , packet_buf[last] that are each 64 KiB.

Packet data including information indicating the following is stored in each of packet_buf[0] to packet_buf[last].

The packet data includes a "valid" field, a "length" field, a "padding [2]" field, and "data [65526]" field.

The "valid" field includes a bool value indicating whether the packet data is valid and awaiting reception processing by SOC[n]. The valid field is set at 1 when the packet data is valid and reception processing by SOC[n] is awaited and set at 0 when the packet data is invalid.

The "length" field includes a 32-bit integer value indicating a valid size [bytes] of an Ethernet frame stored in the data [ ] field.

The "padding [2]" field includes an 8-bit integer value indicating padding for 4-byte alignment of the front of an IP (Internet Protocol) header of an Ethernet frame stored in the "data [ ] field".

The "data [65526]" field includes an 8-bit integer value indicating Ethernet frame data. Note that "65526" is the number of bytes obtained by inverse conversion from 64 KiB, which is the size of packet_buf[i]. As a result, the MTU (Maximum Transmission Unit) is 65,512 bytes.

An example operation of the information processing system 20 according to the second embodiment will now be described by way of a flowchart.

Figure 6:
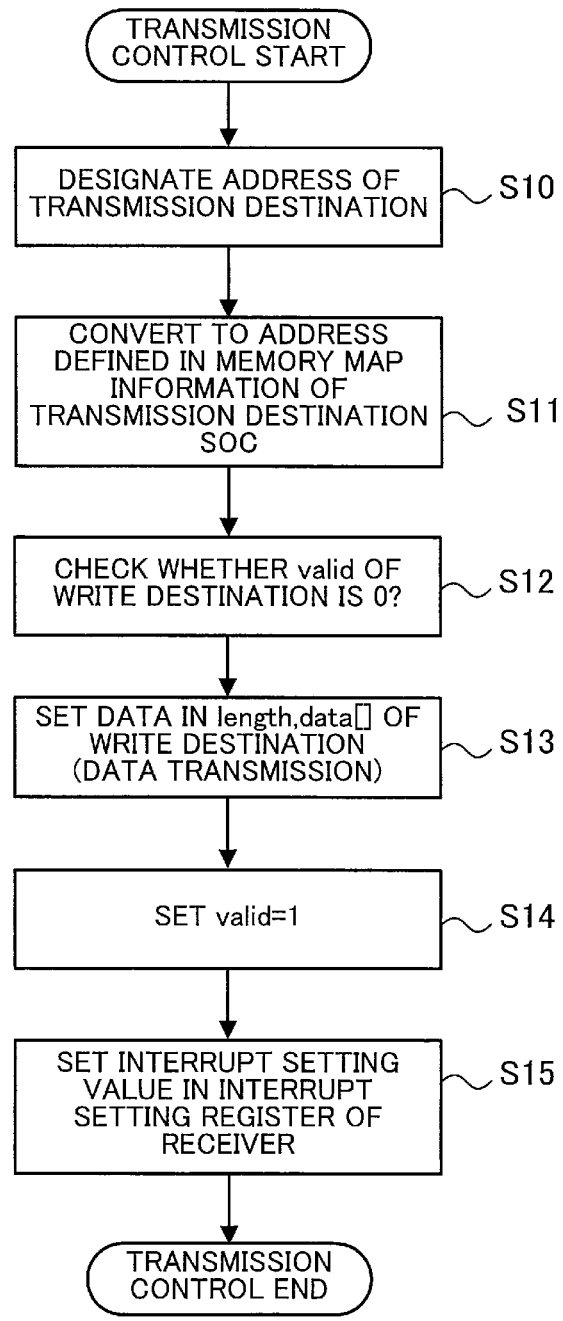
FIG. 6 is a flowchart depicting an example flow of transmission control by the information processing system.

FIG. 6 is a flowchart depicting an example flow of transmission control by the information processing system.

Here, a case where SOC[0] performs a write of data into a memory (DRAM $22a1$) of SOC[1] will be described as an example.

First, the CPU $21b0$ of SOC[0] designates the address in the PCIe bus space $30g0$ that is associated with the address in the local DRAM space $30e1$ of the memory map information $30a1$ for SOC[1] (step S10).

Note that the CPU $21b0$ designates the address so that packet_buf[0] to packet[last] depicted in FIG. 5 are accessed in ascending order. The address is designated so that after packet[last] has been accessed, packet_buf[0] is accessed.

The address in the PCIe bus space $30g0$, like that depicted in FIG. 3 is converted by the MMU $21d0$ to an address in the DRAM space $30e1$ in the memory map information $30a1$ referred to by SOC[1], which is the transmission destination (step S11).

Next, the CPU $21b0$ checks whether the "valid" value of the write destination is 0 (step S12).

As one example, the CPU $21b0$ issues a read instruction for an address produced by conversion by the MMU $21d0$. The CPU $21b0$ then reads, via the switch 23, the value of "valid" for "packet_buf[i]" of the reception buffer region for SOC[0] that is a shared region in the DRAM $22a1$ of SOC[1] corresponding to this address and checks the value.

Note that although omitted from the drawing, when the "valid" value is "1", that is, when the reception buffer region is full, the CPU $21b0$ may determine for example to postpone data transmission for a set period, and then terminate the transmission control when the "valid" value remains 1 after the set period.

Next, the CPU $21b0$ sets data in "length" and "data [ ]" (see FIG. 5) of the write destination (data transmission) (step S13).

The CPU $21b0$ has the data to be written into the reception buffer region as "length" and "data [ ]" outputted to the PCIe interface together with the address converted by the MMU $21d0$. The address and data are transferred to SOC[1] by the switch 23. The address is converted to the actual address in the DRAM $22a1$ at the MMU $21d1$ of SOC[1] and the data is written into the reception buffer region for SOC[0].

After this, the CPU $21b0$ sets "valid" at 1 (step S14). The setting of valid is performed in the same way as the processing in step S13.

Finally, to give notice of the end of transmission (write) to the CPU $21b1$ of SOC[1] that is the reception destination, the CPU $21b0$ sets the interrupt setting value in the interrupt setting register of SOC[1] (step S15).

As one example, the CPU $21b0$ designates the address of the PCIe bus space $30f0$ that is associated with the address of the ICU register space $30b1$ of the memory map information $30a1$ for SOC[1]. The designated address is converted by the MMU $21d0$ to the address of the ICU register space $30b1$ of the memory map information $30a1$ for SOC[1]. The address and the interrupt setting value (for example, "1") indicating the occurrence of an interrupt are then outputted from the PCIe interface $21e0$ based on control by the CPU $21b0$. The address and interrupt setting value are transferred to SOC[1] by the switch 23. The address is converted to the actual address of the interrupt setting register by the MMU $21d1$ of SOC[1], and the interrupt setting value is written into the interrupt setting register.

Figure 7:
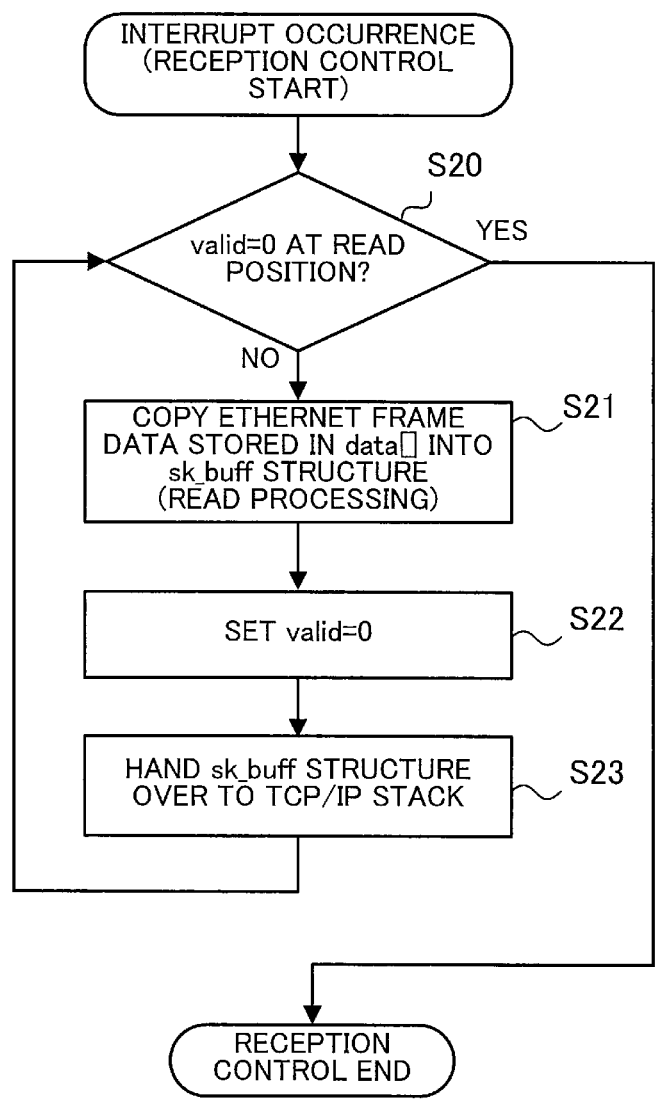
FIG. 7 is a flowchart depicting an example flow of reception control (read control) by the information processing system.

FIG. 7 is a flowchart depicting an example flow of reception control (read control) by the information processing system.

Control by SOC[1] to read out data that has been received is described below.

The CPU 21b1 of SOC[1] starts reception control (read control) on being notified of the occurrence of an interrupt from the ICU 21c1.

The CPU 21b1 first determines whether the valid value at the read position of the reception buffer region of each SOC in the shared region of the DRAM 22a1 is 0 (step S20).

When the valid value is 0, as depicted in FIG. 5, the packet data is invalid and the CPU 21b1 ends the reception control.

When the valid value is 1, the CPU 21b1 performs the processing in step S21. In step S21, a read process that copies the Ethernet frame data stored in the data field like that depicted in FIG. 5 into for example the socket buffer (indicated as sk_buff) structure of the OS (Operating System) is performed.

After this, the CPU 21b1 sets "valid" at 0 (step S22) and hands the socket buffer structure over to the TCP (Transmission Control Protocol)/IP stack (step S23).

Next, the processing returns to step S20, it is determined whether valid is 0 for the next read position, and the same processing is repeated as above.

As described above, based on the memory map information 30a0 to 30aN in which addresses of memories (such as the DRAM 22a1) of other SOC are defined, SOC[0] to SOC[N] are each capable of transmission and write processing that directly designates an address. The information processing system 20 also makes use of the PCIe interfaces 21e0, 21e1, 21a0 to 23an+1, 24a1, and 24a2. This means that SOC[0] to SOC[N] are capable of continuously transmitting data without waiting for a response from a data transmission destination. By operating in this way, the information processing system 20 can perform processing at higher speed.

It is possible to realize a tightly-coupled CPU cluster with high parallelism and high performance at comparatively low cost, without using an expensive high-speed network like that used by a supercomputer. Since it is not necessary to use a high-performance CPU that has high power consumption, it is possible to reduce the power consumption of the information processing system 20.

Based on the memory map information 30a0 to 30aN in which the addresses of the interrupt setting registers of other SOC are defined, SOC[0] to SOC[N] each directly designate an address and set an interrupt setting value. When an interrupt setting value indicating the occurrence of an interrupt has been set, the SOC that is the data transmission destination determines that reception (a write) has ended and performs a read of the transmission data. By doing so, it is possible to virtually recreate Ethernet protocol where data read processing is triggered by packet reception.

The information processing system 20 according to the second embodiment additionally includes the MMU 23b0 to 23bn+1, 24b1, and 24b2 that function as address converting circuits in the switches 23 and 24. By doing so, it is possible to convert the connection state used in communication, such as changing the write destination, without changing the configurations of SOC[0] to SOC[N].

Also, by providing the switches 23 and 24 on multiple stages like in FIG. 2, it is possible to realize an information processing system 20 including a larger number of SOCs, even when there is a physical limitation on the number of SOCs that may be connected to one switch.

Third Embodiment

Figure 8:
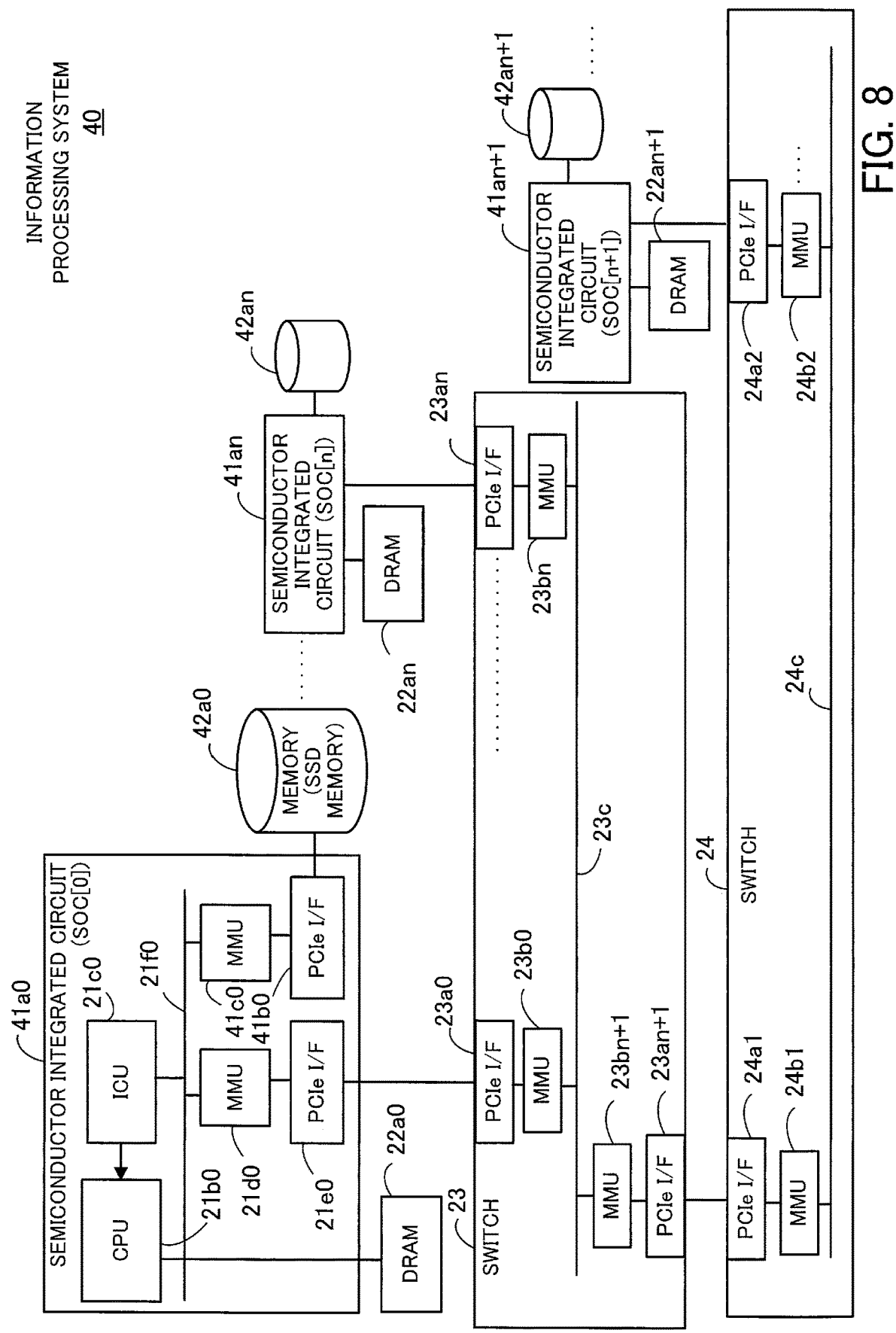
FIG. 8 depicts one example of an information processing system according to a third embodiment.

FIG. 8 depicts one example of an information processing system according to a third embodiment. In FIG. 8, elements that are the same as the information processing system 20 according to the second embodiment depicted in FIG. 2 have been assigned the same reference numerals. In the following description, N semiconductor integrated circuits that include the semiconductor integrated circuits 41a0 to 41an+1 are indicated as SOC[0] to SOC[N]. As examples, the semiconductor integrated circuit 41a0 is indicated as SOC[0] and the semiconductor integrated circuit 41a1 is indicated as SOC [1].

In the information processing system 40 according to the third embodiment, at least two out of SOC[0] to SOC[N] are connected to a memory that differs to the DRAM. In the example in FIG. 8, a memory 42a0 is connected to SOC[0], a memory 42an is connected to SOC[n], and a memory 42an+1 is connected to SOC[n+1].

The memories 42a0 to 42an+1 are all information storage devices that have a larger capacity than the DRAM 22a0 to 22an+1. As one example, the memories 42a0 to 42an+1 are SSD (Solid State Drive) memories.

As one example of an interface for connecting the memory 42a0, SOC[0] includes a PCIe interface 41b0. The PCIe interface 41b0 is connected via an MMU 41c0 to the bus 21f0. That is, the memory 42a0 is connected to the bus 21f0, in the same way as the switch 23 is connected via the PCIe interface 21e0 and the MMU 21d0 to the bus 21f0. The MMU 41c0 has the same functions as the MMU21d0, but when the PCIe interface 41b0 is connected to the memory 42a0, as one example, when access to the memory 42a0 (that is, a write operation or a read operation) is limited to access from the CPU 21b0 inside SOC[0], these functions may be inactivated or the MMU 41c0 itself may be omitted.

The memory 42a0 performs a write operation or a read operation according to a command outputted by the CPU 21b0.

Note that when the MMU 41c0 has the same functions as the MMU 21d0, the switch 23 may be connected to the PCIe interface 41b0 and the memory 42a0 may be connected to the PCIe interface 21e0.

Although omitted from the drawings, SOC[n], SOC[n+1], and the like have the same circuit configuration as SOC[0].

According to the information processing system 40 described above, since it is possible to increase the data size that individual SOCs are able to handle, it is possible to perform distributed processing with higher efficiency. Since the information processing system 40 is based on the information processing system 20 according to the second embodiment that is capable of high-speed processing, it is possible to make advantageous use of this ability and process large-scale data at high speed.

Fourth Embodiment

Figure 9:
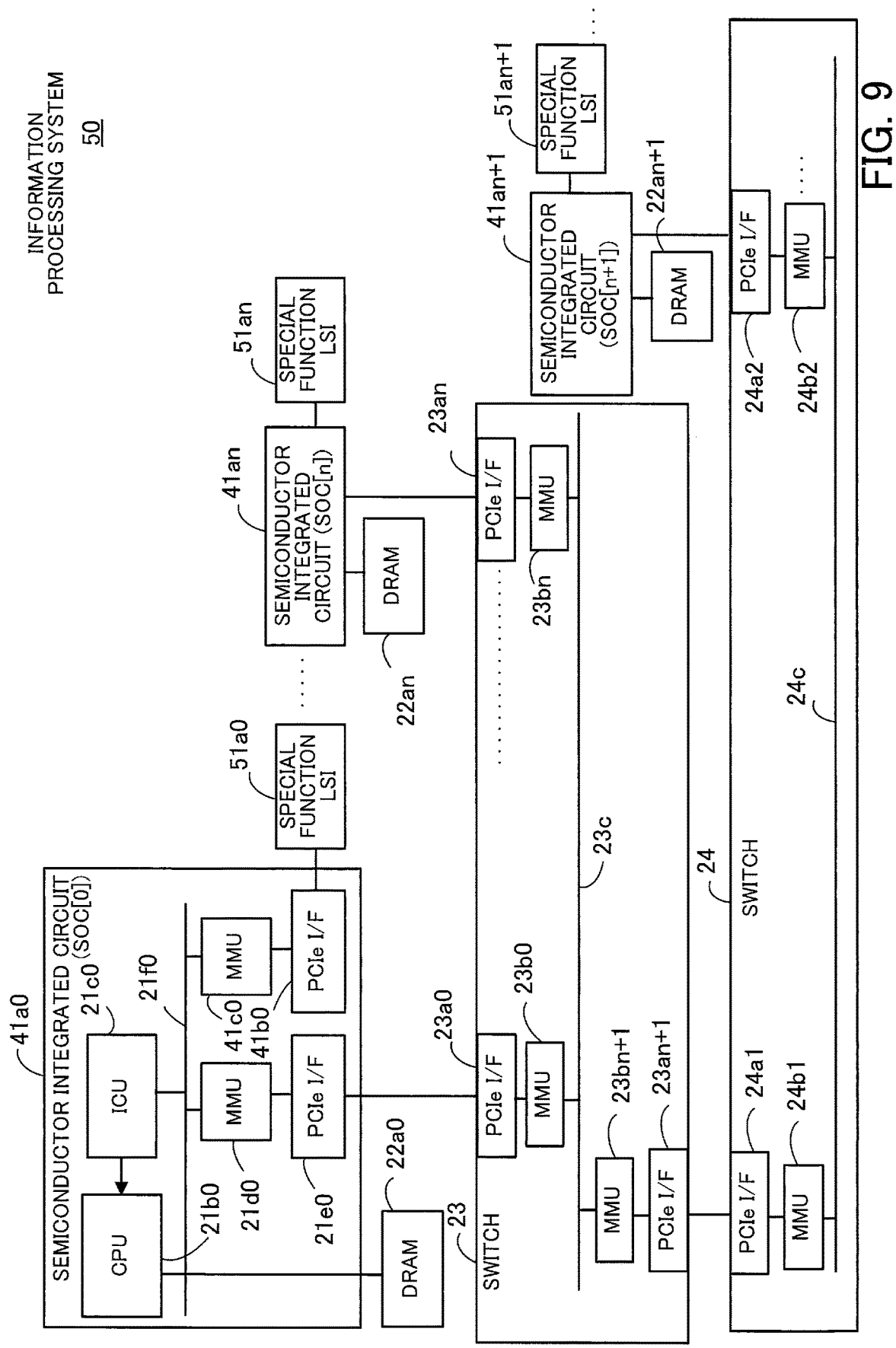
FIG. 9 depicts one example of an information processing system according to a fourth embodiment.

FIG. 9 depicts one example of an information processing system according to a fourth embodiment. In FIG. 9, elements that are the same as the information processing system 40 according to the third embodiment depicted in FIG. 8 have been assigned the same reference numerals.

In the information processing system 50 according to the fourth embodiment, a special-function LSI (Large Scale Integrated circuit) is connected to at least two out of SOC[0] to SOC[N]. In the example in FIG. 9, a special-function LSI 51a0 is connected to SOC[0], a special-function LSI 51an is connected to SOC[n], and a special-function LSI 51an+1 is connected to SOC[n+1].

Each of the special-function LSI 51a0 to special-function LSI 51an+1 is an LSI that performs a task with a comparatively heavy load, such as encode processing for video data, and as one example is an ASSP (Application Specific Standard Product).

As one example, the special-function LSI 51a0 is connected via the PCIe interface 41b0, which is one example of an interface, and the MMU 41c0 to the bus 21f0. The MMU 41c0 has the same functions as the MMU 21d0, but when the PCIe interface 41b0 is connected to the special-function LSI 51a0, such as when operations of the special-function LSI 51a0 are limited to operations based on control signals outputted by the CPU 21b0 in SOC[0], these functions may be inactivated or the MMU 41c0 itself may be omitted.

Note that when the MMU 41c0 has the same functions as the MMU 21d0, the switch 23 may be connected to the PCIe interface 41b0 and the special-function LSI 51a0 may be connected to the PCIe interface 21e0.

The special-function LSI 51a0 operates based on control signals outputted by the CPU 21b0. As one example, when the special-function LSI 51a0 is an HEVC (High Efficiency Video Coding) encoder, the special-function LSI 51a0 receives video data from SOC[0] and generates and outputs HEVC data produced by compressing the video data.

The special-function LSI 51an, 51an+1, and the like are connected in the same way to SCO[n] and SOC [n+1] and operate based on control signals outputted by the CPUs of SCO[n] and SOC[n+1].

According to the information processing system described above, by having the special-function LSIs connected to the respective SOCs perform parallel processing, it is possible to process tasks whose load is comparatively heavy, such as analysis of video data and extraction and aggregation of metadata, with higher efficiency.

Note that the information processing system 40 according to the third embodiment and the information processing system 50 according to the fourth embodiment described above may also be combined with each other. That is, it is possible to connect memories, such as SSD memories, to certain SOCs out of SOC[0] to SOC[N] and to connect special-function LSIs to other SOCs.

It is also possible to further add an interface such as a PCIe interface to SOC[0] to SOC[n+1] and connect both of a memory, such as SSD memory, and a special-function LSI to SOC[0] to SOC[n+1].

It is possible to speed up processing of an information processing system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing system comprising:
a first semiconductor integrated circuit configured to designate, based on first memory map information in which addresses of memories used respectively by a plurality of semiconductor integrated circuits are defined, a first address of a first memory connected to a data transmission destination that is one out of the plurality of semiconductor integrated circuits, to convert the first address to a second address of the first memory, the second address being defined in second memory map information, which is different from the first memory map information, referred to by the data transmission destination, and to output the second address and transmission data by using a bus interface that is capable of continuously transmitting without waiting for a response from the data transmission destination;
a switch configured to transfer the second address and the transmission data to the data transmission destination by using the bus interface; and
a second semiconductor integrated circuit that is the data transmission destination and is configured to receive the second address and the transmission data by using the bus interface and to write the transmission data into a reception buffer region of the first memory, the reception buffer region being corresponding to the second address.

2. An information processing system comprising:
a first semiconductor integrated circuit configured to designate, based on first memory map information in which addresses of memories used respectively by a plurality of semiconductor integrated circuits are defined, a first address of a first memory connected to a data transmission destination that is one out of the plurality of semiconductor integrated circuits, to convert the first address to a second address of the first memory, the second address being defined in second memory map information referred to by the data transmission destination, and to output the second address and transmission data by using a bus interface that is capable of continuously transmitting without waiting for a response from the data transmission destination;
a switch configured to transfer the second address and the transmission data to the data transmission destination by using the bus interface; and
a second semiconductor integrated circuit that is the data transmission destination and is configured to receive the second address and the transmission data by using the bus interface and to write the transmission data into a reception buffer region of the first memory, the reception buffer region being corresponding to the second address; wherein
addresses of storage circuits in which interrupt setting values, each of which indicates whether transmission has ended, are set respectively at the plurality of semiconductor integrated circuits are defined in the first memory map information,
the first semiconductor integrated circuit is configured to designate, based on the first memory map information, a third address of a first storage circuit in which a first interrupt setting value which is one of the interrupt setting values is set at the data transmission destination, to convert the third address to a fourth address of the first storage circuit, the fourth address being defined in the second memory map information, and to output the fourth address and the first interrupt setting value by using the bus interface,
the switch is configured to transfer the fourth address and the first interrupt setting value to the data transmission destination by using the bus interface, and
the second semiconductor integrated circuit is configured to receive the fourth address and the first interrupt setting value by using the bus interface, to write the interrupt setting value into the first storage circuit corresponding to the fourth address, and to determine, based on the first interrupt setting value, whether reception of the transmission data has ended.

3. The information processing system according to claim 2, wherein
the switch includes a first switch and a second switch configured to transmit and receive information by using the first switch and the bus interface, and
the second address, the fourth address, the transmission data, and the first interrupt setting value are transferred via the first switch and the second switch to the second semiconductor integrated circuit.

4. The information processing system according to claim 2,
wherein the switch is configured to convert the second address and the fourth address respectively to a fifth address of a second memory connected to a third semiconductor integrated circuit out of the plurality of semiconductor integrated circuits, and a sixth address of a second storage circuit in which the first interrupt setting value is set at the third semiconductor integrated circuit, the fifth address being defined in third memory map information referred to by the third semiconductor integrated circuit.

5. The information processing system according to claim 2,
wherein the second semiconductor integrated circuit includes a second control circuit and an interrupt control circuit configured to provide, based on the first interrupt setting value, the second control circuit with an interrupt signal indicating that reception of the transmission data has ended.

6. The information processing system according to claim 2, wherein the first memory map information includes:
a first address space that defines an address of a memory connected to a semiconductor integrated circuit that refers to the first memory map information, out of the plurality of semiconductor integrated circuits;
a second address space that defines an address of a memory connected to another semiconductor integrated circuit other than the semiconductor integrated circuit that refers to the first memory map information;
a third address space that defines an address of a storage circuit in which an interrupt setting value of the semiconductor integrated circuit that refers to the first memory map information is set; and
a fourth address space that defines an address of a storage circuit in which an interrupt setting value of the another semiconductor integrated circuit is set.

7. The information processing system according to claim 1,
wherein in the reception buffer region, buffer regions that respectively correspond to the plurality of semiconductor integrated circuits are set so as to be designated by respectively different addresses.

8. The information processing system according to claim 1,
wherein the first semiconductor integrated circuit includes a first control circuit configured to designate the first address, a first address converting circuit configured to convert the first address to the second address, and the bus interface.

9. The information processing system according to claim 1,
wherein the bus interface that is capable of continuously transmitting without waiting from a response from the data transmission destination, is a PCIe (Peripheral Component Interconnect express) interface.

10. The information processing system according to claim 1,
wherein third memories with larger capacities than the memories used respectively by the plurality of semiconductor integrated circuits are connected to at least two out of the plurality of semiconductor integrated circuits.

11. The information processing system according to claim 1,
wherein special-function LSIs (Large Scale Integrated circuits) are connected to at least two out of the plurality of semiconductor integrated circuits.

12. A semiconductor integrated circuit comprising:
a control circuit configured to designate, based on first memory map information in which addresses of memories used respectively by a plurality of semiconductor integrated circuits are defined, a first address of a first memory connected to a data transmission destination, which is one out of the plurality of semiconductor integrated circuits;
an address converting circuit configured to convert the first address to a second address of the first memory, the second address being defined in second memory map information, which is different from the first memory map information, referred to by the data transmission destination; and
a first bus interface configured to output the second address and transmission data, the first bus interface being capable of continuously transmitting without waiting for a response from the data transmission destination.

13. A semiconductor integrated circuit comprising:
a control circuit configured to designate, based on first memory map information in which addresses of memories used respectively by a plurality of semiconductor integrated circuits are defined, a first address of a first memory connected to a data transmission destination, which is one out of the plurality of semiconductor integrated circuits;
an address converting circuit configured to convert the first address to a second address of the first memory, the second address being defined in second memory map information referred to by the data transmission destination; and
a first bus interface configured to output the second address and transmission data, the first bus interface being capable of continuously transmitting without waiting for a response from the data transmission destination, wherein
addresses of storage circuits in which interrupt setting values, each of which indicates whether transmission has ended, are set respectively at the plurality of semiconductor integrated circuits are defined in the first memory map information,
the control circuit is configured to designate, based on the first memory map information, a third address of a first storage circuit in which a first interrupt setting value which is one of the interrupt setting values is set at the data transmission destination,
the address converting circuit is configured to convert the third address to a fourth address of the first storage circuit, the fourth address being defined in the second memory map information, and
the first bus interface is configured to output the fourth address and the first interrupt setting value.

14. The semiconductor integrated circuit according to claim 12, wherein the first bus interface is configured to receive a fifth address of a second memory and write data from another semiconductor integrated circuit, the fifth address being defined in the first memory map information, and to write the write data into a reception buffer region of the second memory, the reception buffer region being corresponding to the fifth address.

15. The semiconductor integrated circuit according to claim 14, further comprising:
a second storage circuit in which an interrupt setting value is set,
wherein
the first bus interface is configured to receive a sixth address of the second storage circuit and the interrupt setting value that have been outputted from the another semiconductor integrated circuit, the sixth address being defined in the first memory map information, and to write the interrupt setting value into the second storage circuit corresponding to the sixth address, and
the control circuit is configured to determine, based on the interrupt setting value, whether reception of the write data has ended.

16. The semiconductor integrated circuit according to claim 15, further comprising:
an interrupt control circuit configured to provide, based on the interrupt setting value, the control circuit with an interrupt signal indicating that reception of the write data has ended.

17. The semiconductor integrated circuit according to claim 12, wherein
the first memory map information includes:
a first address space that defines an address of the second memory;
a second address space that defines an address of the first memory;
a third address space that defines an address of the second storage circuit; and
a fourth address space that defines an address of the first storage circuit.

18. The semiconductor integrated circuit according to claim 12, further comprising:
a second bus interface capable of connecting to a third memory with a larger capacity than the memories used respectively by the plurality of semiconductor integrated circuits or a special-function LSI.

19. An information processing method comprising:
designating, by a first semiconductor integrated circuit, based on first memory map information in which addresses of memories used respectively by a plurality of semiconductor integrated circuits are defined, a first address of a first memory connected to a data transmission destination that is one out of the plurality of semiconductor integrated circuits, converting the first address to a second address of the first memory, the second address being defined in second memory map information, which is different from the first memory map information, referred to by the data transmission destination, and outputting the second address and transmission data by using a bus interface that is capable of continuously transmitting without waiting for a response from the data transmission destination;
transferring, by a switch, the second address and the transmission data to the data transmission destination by using the bus interface; and
receiving, by a second semiconductor integrated circuit that is the data transmission destination, the second address and the transmission data by using the bus interface, and writing the transmission data into a reception buffer region of the first memory, the reception buffer region being corresponding to the second address.

20. An information processing method comprising:
designating, by a first semiconductor integrated circuit, based on first memory map information in which address of memories used respectively by a plurality of semiconductor integrated circuits are defined, a first address of a first memory connected to a data transmission destination that is one out of the plurality of semiconductor integrated circuits, converting the first address to a second address of the first memory, the second address being defined in a second memory map information referred to by the data transmission destination, and outputting the second address and transmission data by using a bus interface that is capable of continuously transmitting without waiting for a response from the data transmission destination;
transferring, by a switch, the second address and the transmission data to the data transmission destination by using the bus interface; and
receiving, by a second semiconductor integrated circuit that is the data transmission destination, the second address and the transmission data by using the bus interface, and writing the transmission data into a reception buffer region corresponding to the second address;
wherein addresses of storage circuits in which interrupt setting values, each of which indicates whether transmission has ended, are set respectively at the plurality of semiconductor integrated circuits are defined in the first memory map information,
designating, by the first semiconductor integrated circuit, based on the first memory map information, a third address of a first storage circuit in which a first interrupt setting value which is one of the interrupt setting values is a set at the data transmission destination, converting the third address to a fourth address of the first storage circuit, the fourth address being defined in the second memory map information, and outputting the fourth address and the first interrupt setting value by using the bus interface,
transferring, by the switch, the fourth address and the first interrupt setting value to the data transmission destination by using the bus interface,
receiving, by the second semiconductor integrated circuit, the fourth address and the first interrupt setting value by using the bus interface, writing the interrupt setting value into the first storage circuit corresponding to the fourth address, and determining, based on the first interrupt setting value, whether reception of the transmission data has ended.

* * * * *